United States Patent [19]

Styrna et al.

[11] Patent Number: 5,034,915
[45] Date of Patent: Jul. 23, 1991

[54] DATA STORAGE SYSTEM FOR TRANSFERRING LAST ENTERED INFORMATION FROM STATIC MEMORY TO MAGNETIC DISK UPON RECOVERING FROM DATA STORAGE INTERRUPTION

[75] Inventors: Zbigniew B. Styrna; Michael Afheldt, both of Kanata, Canada

[73] Assignee: Mitel Corporation, Ontario, Canada

[21] Appl. No.: 409,966

[22] Filed: Sep. 18, 1989

Related U.S. Application Data

[63] Continuation of Ser. No. 874,709, Jun. 16, 1986, abandoned.

[30] Foreign Application Priority Data

Dec. 20, 1985 [CA] Canada .................................. 498398

[51] Int. Cl.⁵ ........................ G06F 15/00; G06F 1/26; G06F 12/16
[52] U.S. Cl. ................................ 364/900; 364/948.5; 364/945.3; 364/953; 371/66
[58] Field of Search ... 364/200 MS File, 900 MS File, 364/707; 371/66; 365/227, 228; 360/69, 79, 99

[56] References Cited

U.S. PATENT DOCUMENTS

| | | | |
|---|---|---|---|
| 3,801,963 | 4/1974 | Chen | 371/66 X |
| 4,171,539 | 10/1979 | Tawfik et al. | 364/900 |
| 4,323,987 | 4/1982 | Holtz et al. | 371/66 X |
| 4,381,552 | 4/1983 | Nocilini et al. | 364/900 |
| 4,433,395 | 2/1984 | Iyehara et al. | 365/222 |
| 4,458,307 | 7/1984 | McAnlis et al. | 364/200 |
| 4,467,447 | 8/1984 | Takahashi et al. | 364/900 |
| 4,497,021 | 1/1985 | Fukuda et al. | 364/200 |
| 4,525,800 | 6/1985 | Hamerla | 371/66 X |
| 4,571,702 | 2/1986 | DeArras | 364/900 |
| 4,583,133 | 4/1986 | Shoji et al. | 360/69 |
| 4,611,289 | 9/1986 | Coppola | 364/200 |
| 4,633,432 | 12/1986 | Kitamura | 364/900 |
| 4,665,536 | 5/1987 | Kim | 364/707 X |
| 4,667,289 | 5/1987 | Yoshida et al. | 364/200 |
| 4,694,393 | 9/1987 | Hirano et al. | 364/200 |
| 4,696,707 | 10/1987 | Heys, Jr. et al. | 360/99 |
| 4,698,748 | 10/1987 | Juzswik | 364/200 |
| 4,700,243 | 10/1987 | Tsuyuguchi et al. | 360/99 |
| 4,716,522 | 12/1987 | Funabashi et al. | 364/200 |
| 4,723,223 | 2/1988 | Hanada | 364/900 |
| 4,959,774 | 9/1990 | Davis | 364/200 |

FOREIGN PATENT DOCUMENTS

| | | | |
|---|---|---|---|
| 56-134357 | 10/1981 | Japan | 360/99 |
| 58-211359 | 12/1983 | Japan | 360/137 |

OTHER PUBLICATIONS

IBM Technical Disclosure Bulletin, vol. 16, No. 12, May 1974, pp. 4027–4029.
IBM Technical Disclosure Bulletin, vol. 22, No. 10, Mar. 1980, pp. 4351–4352.
Byte, Sep. 1985, p. 96, pub. McGraw-Hill.

*Primary Examiner*—Thomas C. Lee
*Attorney, Agent, or Firm*—Antonelli, Terry, Stout & Kraus

[57] ABSTRACT

A data storage system comprised of a disk drive including a magnetic disk for storing an operating system program, a dynamic RAM memory circuit for temporarily storing the operating system program, a static memory circuit for temporarily storing customer entered data, and a direct memory access controller for periodically transferring the customer entered data from the static memory circuit to the magnetic disk and for transferring the operating system program from the magnetic disk to the dynamic RAM memory circuit in response to execution of a bootstrap or power-up program by the microprocessor. In the case of a power down during entry of customer entered data, the customer entered data is saved in the static memory and is transferred to the magnetic disk during the subsequent power up thereby avoiding the use of possibly corrupted data on the disk drive.

7 Claims, 2 Drawing Sheets

DATA STORAGE SYSTEM FOR TRANSFERRING LAST ENTERED INFORMATION FROM STATIC MEMORY TO MAGNETIC DISK UPON RECOVERING FROM DATA STORAGE INTERRUPTION

This application is a continuation of application Ser. No. 874,709, filed June 16, 1986, now abandoned.

FIELD OF THE INVENTION

This invention relates to data storage systems in general, and more particularly to a microprocessor controlled data storage system for storing a PABX operating system program and customer entered data.

DESCRIPTION OF PRIOR ART

Modern day PABXs typically use one or more microprocessors for controlling the interconnection of telephone lines and trunks in response to execution of an operating system program. Unlike most computers, to which the user has easy access for removing, inserting or replacing magnetic data disks, a PABX is typically installed in a location which is relatively inaccessible. Once the PABX has been installed and configured for operation in a particular setting, such as a hotel or business office, it is desired that the PABX be visibly and aurally inconspicuous. Hence, PABXs are frequently installed in remote areas such as subterranean storage rooms etc., in order that they be acoustically and visually isolated from the users. In order to minimize occurrences of system failures, as a result of being stored in such hostile environments, PABXs are required to be very reliable.

Prior art PABXs typically used erasable programmable memories (EPROMs), or bubble memories in order to store up to approximately 14k bytes of operating system program. EPROMs and bubble memories are highly reliable but relatively expensive.

PABXs have become more sophisticated and user friendly, requiring large amounts of memory for storing large amounts of customer entered data and new releases of sophisticated operating system programs. According to the prior art, this required large amounts of RAM for storing the customer entered data, as well as the replacement or reprogramming of expensive EPROMs or bubble memories in order to store the new operating system programs. A sophisticated operating system program typically requires up to approximately ½ megabyte of memory. The cost of implementing such an operating system in EPROM or bubble memory is financially prohibitive. Storing large amounts of customer entered data in static RAM is similarly prohibitive.

SUMMARY OF THE INVENTION

According to the present invention, a microprocessor controlled disk drive, including a floppy disk, is utilized for storing a sophisticated operating system program as well as customer entered data. The program is downloaded from the disk onto inexpensive dynamic RAM upon powering up the PABX. A small amount of static CMOS RAM is utilized for temporarily storing the customer entered data. The CMOS RAM acts as a "spool" in the sense that in the event each location thereof has been loaded with data, the contents are then uploaded onto the floppy disk.

Microcomputers typically use floppy disks for storing programs. However, because of the interactive nature of microcomputers, (i.e., data is frequently written to and read from the floppy disks), the disks and disk drives have typically very low reliability. For instance, it is well known that blocks of data stored on a disk can be deleted or become inaccesible as a result of magnetic oxide being worn off the disk or dust particles being deposited thereon. Reliability of floppy disks decreases with the number of disk accesses, (i.e. read and write operations). However, since the computers are typically located in the environment of the user, the user has easy access to the disk drive and can simply replace a faulty disk or drive in the event of discovery of bad data blocks, etc.

However, as discussed above, PABXs are usually not easily accessible. Also, whereas a computer floppy disk drive is frequently read from and written to, due to the interactive nature of computer programs, the disk drive according to the present invention is infrequently accessed, typically only during power-up of the PABX in order to download the operating system program to dynamic RAM, and during uploading of customer entered data from CMOS RAM to the floppy disk. Hence, there is very low oxide wear from the floppy disk as a result of the infrequent accesses, and consequently higher disk and disk drive reliability.

In addition, the disk drive motor is microprocessor controlled so as to turn on only during data transfers to or from the floppy disk, and otherwise remains off, resulting in longer motor lifetime, less power consumption, and less heat generation.

In general, the invention is a data storage system, comprised of circuitry for generating control signals, a disk drive including a magnetic disk for permanently storing data signals, a dynamic memory for temporarily storing the data signals, circuitry for receiving first predetermined ones of the control signals and enabling the disk drive in response thereto, circuitry for receiving second predetermined ones of the control signals and transferring the permanently stored data signals from the disk drive to the dynamic memory in response to reception of the second control signals and the disk drive being enabled, and circuitry for disabling the disk drive upon completion of the data signal transfer.

More particularly, the invention is a data storage system comprised of a data bus, a RAM circuit connected to the data bus, a ROM circuit connected to the data bus for storing digital reset program signals, a microprocessor connected to the data bus for receiving the reset program signals and generating a plurality of control signals in response thereto, and a disk drive including a magnetic disk, connected to the data bus for storing operating system program signals. The invention is further comprised of a DMA controller connected to the data bus and the microprocessor for receiving a first predetermined one or more of the control signals and transferring the operating system program signals from the disk drive to the RAM circuit in response thereto, and a switchable power supply circuit connected to the microprocessor for detecting a second predetermined one or more of the control signals and enabling and supplying power to the disk drive in response thereto, and disabling and removing power from the disk drive in the absence of detection of the second control signals, whereby the operating system is downloaded from the magnetic disk to the RAM circuit in response to the microprocessor executing the bootstrap program, after which the disk drive is disabled and power is removed therefrom by the switchable power supply circuit.

BRIEF DESCRIPTION OF THE DRAWINGS

A better understanding of the invention will be obtained by reference to the detailed description below, and to the following drawings, in which.

DESCRIPTION OF THE PREFERRED EMBODIMENTS

Figure 1:
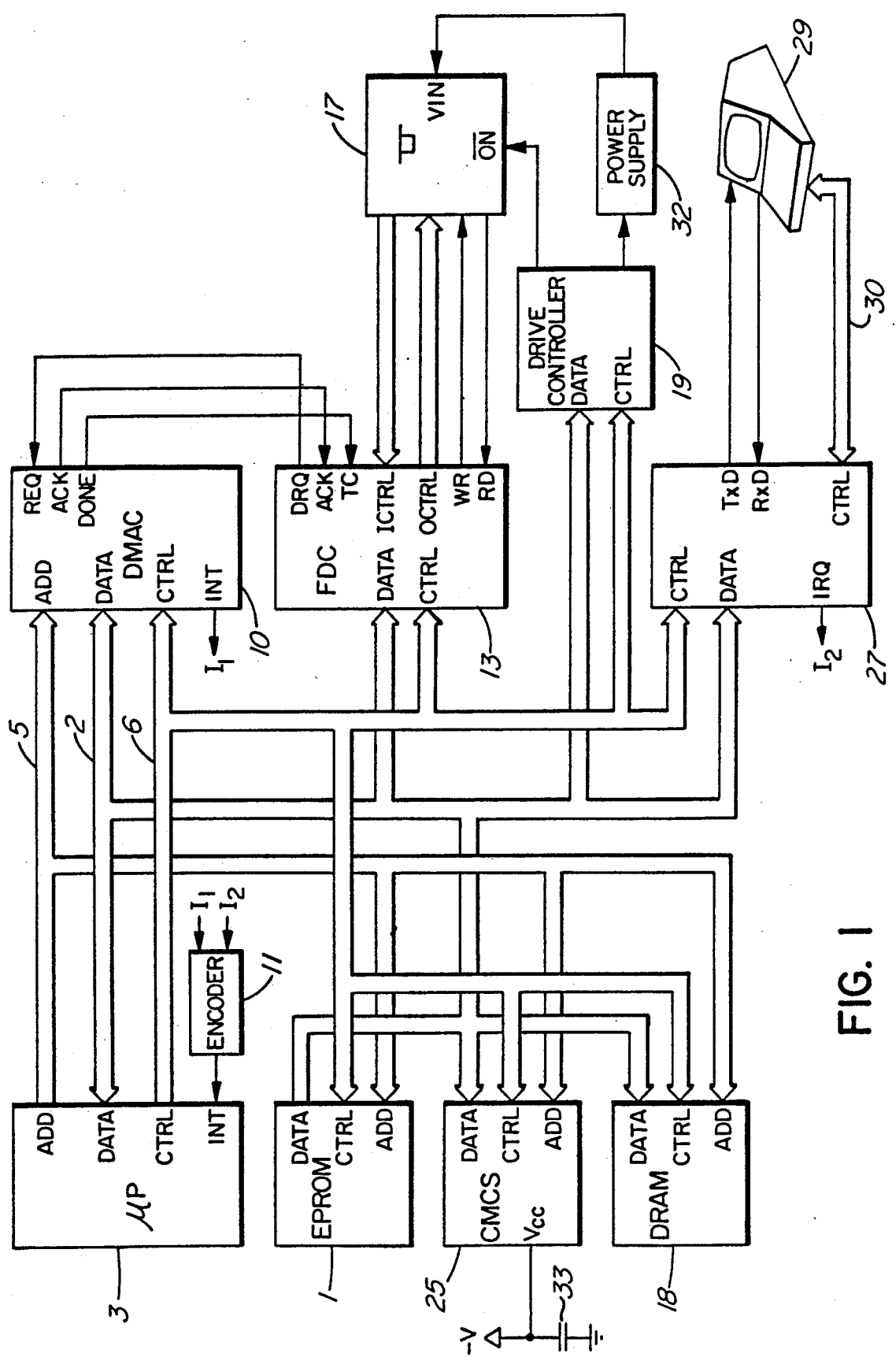
FIG. 1 is a schematic diagram of a preferred embodiment of the invention.

With reference to FIG. 1, an EPROM circuit 1 is shown connected to a microprocessor 3 via data, address and control buses 2, 5 and 6 respectively.

EPROM circuit 1 typically contains a program for implementing a bootstrap process in response to the microprocessor 3 being powered up or reset. EPROM 1 is enabled in response to receiving a signal from the control bus 6, generated by the microprocessor 3.

A direct memory access controller DMAC 10 is shown connected to microprocessor 3 via data bus 2, address bus 5 and control bus 6.

A floppy disk controller FDC 13 is connected to microprocessor 3 via data bus 2 and control bus 6, and to a floppy disk drive 17 including a floppy disk containing the operating system program.

In operation, microprocessor 3 executes the bootstrap program stored in EPROM circuit 1 and in response configures FDC 13 for reading data from the disk drive 17, by loading predetermined data signals into internal registers thereof for defining bit transmission rate, parity bit generation etc. The microprocessor then configures the DMAC 10 to perform a data transfer from FDC 13 to a dynamic random access memory DRAM 18 connected to microprocessor 3 via the data, address and control buses 2, 5 and 6 respectively, the DMAC 10 is configured by loading internal data registers thereof with first and last valid addresses of DRAM 18 for defining the address space in which the operating system program is to be stored.

Microprocessor 3 generates signals on the data bus 2, for application to a disk drive controller 19 in response to executing further instructions of the bootstrap program stored in EPROM circuit 1. The signals are latched in controller 19 which generates enable signals for application to a power supply circuit 32, and to the disk drive 17 in response thereto. Power supply circuit 32 is typically comprised of transistor circuitry for gating 12 and 5 volt power sources to the VIN power inputs of disk drive 17, as described below with reference to FIG. 2. Controller 19 also generates an enable signal for application to an $\overline{ON}$ input of disk drive 17, for enabling the disk drive motor.

FDC 13 then performs a series of handshaking operations with disk drive 17 via input and output control buses ICTRL and OCTRL respectively, in order to initialize a data read operation from the disk. FDC 13 generates a DMA request by causing a DRQ output thereof to go high. The DMA request is received on a REQ input of DMAC 10. In response, DMAC 10 generates a DMA acknowledge signal from an ACK output thereof for reception by an ACK input of FDC 13. Various bus arbitration status signals are generated by DMAC 10 along the control bus 6 for reception by microprocessor 3, in order to signal the microprocessor that the DMAC has control or "mastership" of the address and data busses 5 and 2 respectively.

FDC 13 begins reading the operating system program, which is typically in the form of serial digital signals, via the RD input thereof from disk drive 17. The received signals are converted from serial to parallel format in FDC 13 and applied via the DATA terminals thereof to data bus 2. The parallel digital signals are received on DATA terminals of DMAC 10 from data bus 2, and reapplied therefrom to the data bus for transmission to and storage in successive locations of DRAM 18 (as defined by predetermined address signals appearing on the address bus 5 and generated by DMAC 10).

Transfer of the operating system program from disk drive 17 to DRAM 18 continues according to well known DMA transfer techniques, until the entire operating system program has been stored in the DRAM, (i.e., the last valid memory address of DRAM 18 has been loaded).

DMAC 10 generates a signal from a DONE output thereof, for reception by a terminal count input, TC, of FDC 13 in order to signal the disk controller that the transfer has been completed.

DMAC 10 then generates an interrupt signal I1 on an INT output thereof for application to a priority interrupt encoder 11. Encoder 11 determines which of a plurality of interrupt signals, such as I1 and I2 has highest priority for interrupting the microprocessor 3, and generates an interrupt signal in response thereto.

Microprocessor 3 generates further data signals for application to controller 19 via data bus 2, in response to receiving the interrupt signal, for causing controller 19 to generate disable signals in order to turn off the power supply circuit 32 and disable the disk drive motor, as described in further detail below with reference to FIG. 2.

Instructions of the operating system program stored in DRAM 18 are then executed by the microprocessor 3 in a well known manner.

As discussed above, according to the present invention, customer entered data is temporarily stored in static memory and from time to time transferred for permanent storage onto the floppy disk. Customer entered data is received from a terminal 29, such as a video display terminal, via a UART 27 connected via data terminals (DATA) thereof, to the data bus 2.

In operation, in the event the user or customer wishes to enter data, the data is entered into terminal 29 which generates and applies a UART request signal to a control bus 30 connected between the UART 27 and data terminal 29. A plurality of handshaking control signals are transmitted between the data terminal and UART along the control bus 30 in a well known manner. The user entered data is received by an $R_xD$ input of UART 27 from the terminal 29. UART 27 generates an interrupt signal I2 via an IRQ output thereof to priority interrupt encoder 11 for providing an interrupt signal to microprocessor 3. Microprocessor 3 generates control signals to the control bus 6 for controlling a data transfer from UART 27 to a CMOS RAM 25, via data bus 2 in response to receiving the interrupt signal. UART 27 converts the received data from serial to parallel format and applies the parallel format data to data bus 2 for storage in predetermined locations of CMOS RAM 25, in response to receiving the aforementioned control signals from microprocessor 3.

In the event the customer enters further data into the terminal 29, the microprocessor is again interrupted and the data is transferred for storage in additional locations of CMOS RAM 25 via data bus 2. In this way, successive locations of CMOS RAM 25 are loaded with user defined data from terminal 29.

In the event each location of CMOS RAM 25 is loaded, (i.e., the CMOS RAM 25 is full), microprocessor 3 configures DMAC 10 for performing a DMA data transfer from CMOS RAM 25 to FDC 13. FDC 13 then generates a DMA request via the DRQ output thereof, and DMAC 10 generates an acknowledge signal in response thereto. DMAC 10 gains "mastership" of address bus 5 and data bus 2, and performs a DMA data transfer from CMOS RAM 25 to FDC 13 in a well known manner. Disk drive 17 is enabled and circuit 32 provides operating power to the disk drive in response to controller 19 receiving a data signal from microprocessor 3, as described above. Data received by FDC 13 is written to disk drive 17 for storage on the floppy disk in a well known manner.

Once the DMA data transfer has been completed DMAC 10 generates a signal on the DONE output thereof for application to FDC 13 in order to indicate completion of the data transfer, and the interrupt signal Il is generated from the INT output of DMAC 10 in order to signal the microprocessor 3 that the data transfer is complete.

Details of the various control signals carried by control bus 6, such as handshaking signals between the microprocessor 3 and DMAC 10 are not described in detail herein but are well known to persons skilled in the art.

CMOS RAM 25 has a power input VCC thereof connected to a power supply source −V and capacitor 33 for providing capacitor backup in the event of power failure. Hence, data stored in CMOS RAM 25 that has not been uploaded to floppy disk is not lost in the event of power failure. In a successful embodiment of the invention, capacitor 33 was a 3 farad capacitor connected between a −5 volt power supply and ground.

Figure 2:
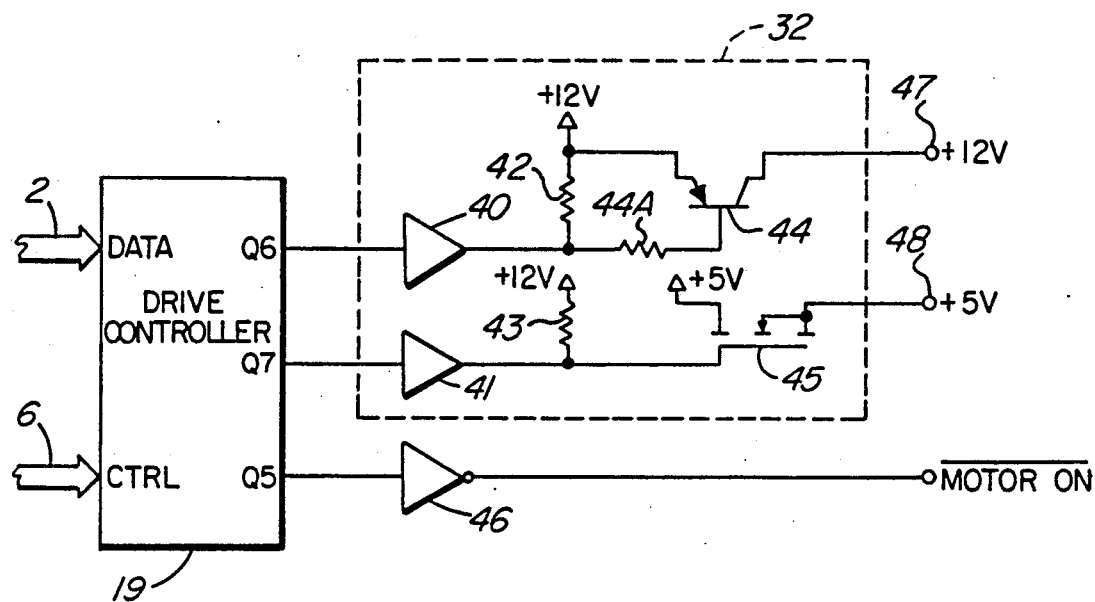
FIG. 2 is a schematic diagram of power control and power supply circuits according to the preferred embodiment of the invention.

With reference to FIG. 2, disk drive controller 19 is shown having Q6 and Q7 outputs thereof connected to buffers 40 and 41, respectively. Controller 19 is comprised of an addressable latch in the preferred embodiment. The outputs of buffers 40 and 41 are connected to pull-up resistors 42 and 43 respectively and to a base terminal of PNP transistor 44 via current limiting resistor 44A, and to a gate terminal of VMOS FET transistor 45. Pull-up resistors 42 and 43 are connected to +12 volt sources of power.

PNP transistor 44 has an emitter terminal thereof connected to the 12 volt source and a collector terminal connected to an output terminal 47 for connection to disk drive 17.

VMOS FET 45 is an n-channel enhancement type FET having a drain terminal thereof connected to a source of +5 volts. A substrate of VMOS FET 45 is connected to a source terminal thereof and to an output terminal 48 for providing +5 volt operating power to disk drive 17.

A further output of disk drive controller 19 is connected to an inverting buffer 46 for enabling disk drive 17 as discussed above.

In operation, data signals indicative of a data transfer request to or from the disk drive 17, are received from the data bus 2 and loaded into disk drive controller 19 in response to receiving a signal on the control bus 6. In response to reception of the data signals, the outputs of disk drive controller 19 go to logic high levels. These signals are applied to buffers 40 and 41 and inverting buffer 46. The signal applied to inverting buffer 46 is inverted therein and applied to an enable input of disk drive 17. The signals applied to buffers 40 and 41 are transmitted therefrom so as to enable transistors 44 and 45 to become conductive, thereby transmitting the 12 volt D.C. source to the output terminal 47, via the emitter-collector path of PNP transistor 44, and transmitting the +5 volt D.C. source to output terminal 48 via the drain-source channel of VMOS FET 45.

Hence, disk drive 17 is enabled in response to receiving the enable signal from inverting buffer 46 and the power supply voltages from terminals 47 and 48 respectively.

Figure 3:
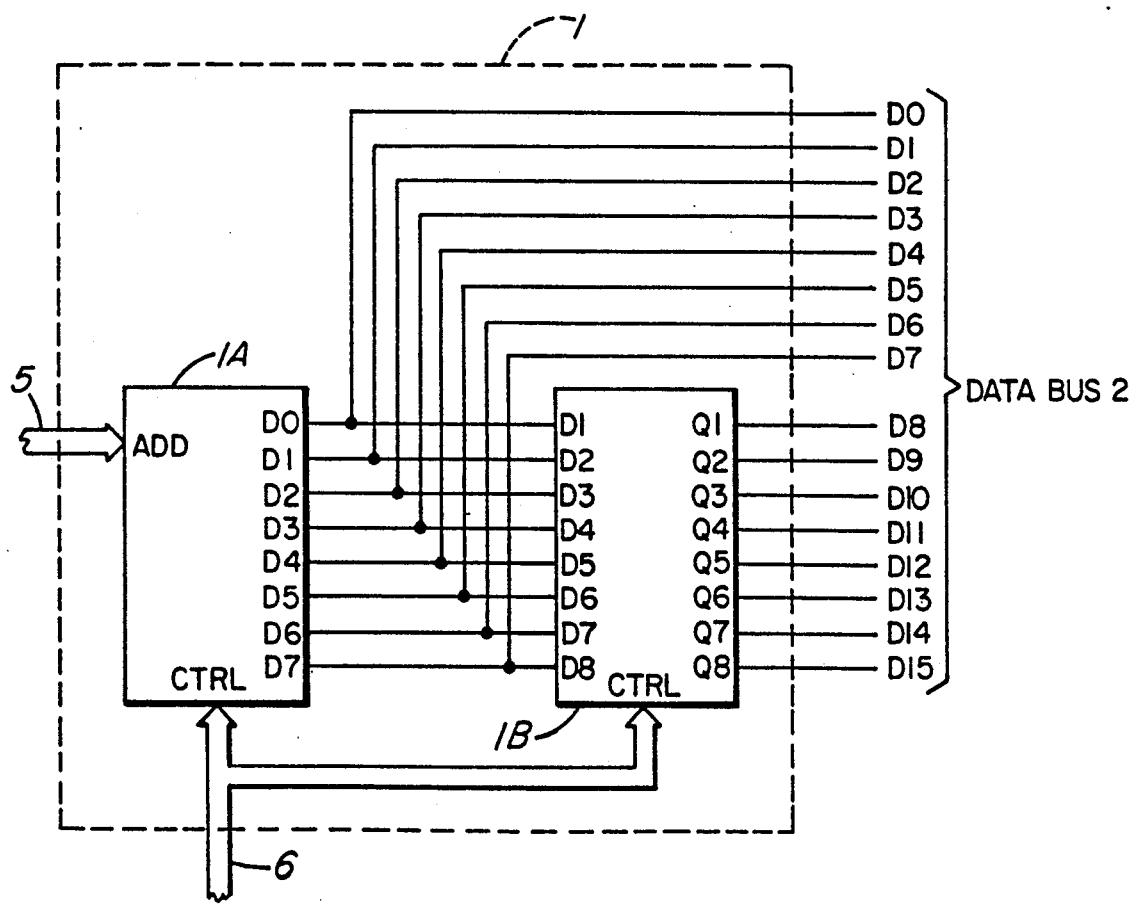
FIG. 3 is a schematic diagram of an EPROM circuit according to the preferred embodiment of the invention.

According to the preferred embodiment of the invention, data bus 2 is a 16 bit data bus. As discussed above, it is desired to reduce the number of expensive EPROMs in a data storage system. Hence, according to the preferred embodiment, as illustrated in FIG. 3, a single 8 bit EPROM chip 1A is interfaced with the 16 bit data bus 2 via an 8 bit latch circuit 1B, whereas two 8 EPROM bit chips would normally be required.

Sixteen bit instructions of the bootstrap program are stored in the 8 bit EPROM chip 1A such that a most significant byte of an instruction is stored in a predetermined memory location and the least significant byte thereof is stored in the next contiguous location. Hence, according to the preferred embodiment, 128 16-bit instructions are stored in 256 locations of the single 8 bit EPROM chip 1A.

In operation, the most significant byte of an instruction is transmitted from the D0–D7 outputs of EPROM chip 1A to the D1–D8 inputs of latch circuit 1B in response to receiving address and control signals from address and control buses 5 and 6 respectively. The most significant byte of the instruction is stored in latch circuit 1B. The least and most significant bytes of the instruction are then simultaneously transmitted from the D0–D7 outputs of EPROM chip 1A and the Q1–Q8 outputs of latch circuit 1B respectively, to the D0–D15 lines of data bus 2, in response to receiving further signals on the address and control buses 5 and 6. Hence, a 16 bit instruction is generated by a single 8 bit EPROM chip, and applied to the data bus 2.

In a successful prototype of the invention, microprocessor 3 was a Model 68000 microprocessor manufactured by Motorola Inc., FDC 13 was a single/double density floppy disk controller Model 765, manufactured by NEC Electronics USA Inc., DMA controller 10 was a Model 68450 direct memory access controller manufactured by Motorola Inc., and disk drive 17 was a Mitzubishi Model.

In summary, the present invention is a reliable, inexpensive data storage system for storing an operating system program as well as customer entered data. A disk drive houses a floppy disk, on which the operating system is stored, resulting in considerably less expense than prior art EPROM or bubble memory data storage systems. A small amount of CMOS RAM is utilized for temporarily storing the customer entered data, which is periodically uploaded onto the floppy disk. The disk drive is accessed very infrequently (i.e., during system power-up or reset and occasionally in order to upload the customer entered data). Hence, there is less magnetic oxide wear than in prior art disk storage systems. Also, because floppy disk storage is relatively inexpensive, new or updated versions of sophisticated operating system programs can be inexpensively implemented by periodically exchanging floppy disks.

Persons skilled in the art understanding this invention may now conceive of other embodiments or variations using the principles of the invention, as described above. For instance, a hard disk can be used instead of a floppy disk or diskette, suitable changes being made to the floppy disk controller 13 and power supply circuitry 32. Also, a plurality of encapsulated disk drives can be utilized in order to store further programs or customer entered data.

In addition, the floppy disk drive can be encapsulated in order to protect the floppy disk from an accumulation of dust particles. Also, relays or other switching circuits can be used instead of the transistor power supply circuit 32 (FIG. 2) in order to provide power to the disk drive 17.

DMAC 10 can be replaced by discrete circuitry for performing data transfers between the floppy disk controller 13 and CMOS RAM 25 or DRAM 18. Alternatively, the data transfer operations can be performed directly by the microprocessor 3, suitable allowance being made for the additional length of time typically required for a microprocessor to perform such data transfers.

In addition, the present invention can be used in any computer based system which requires infrequent access to data, and is not restricted to the preferred embodiment of a data storage system utilized in conjunction with a PABX.

All such variations and other embodiments of the invention are considered to be within the sphere and scope of the present invention as defined in claims appended hereto.

We claim:

1. In a communication switching system, a data storage system comprised of:
   (a) a microprocessor for generating a plurality of control signals;
   (b) disk drive means including magnetic disk means, for storing customer entered data signals and digital program signals;
   (c) means for receiving blocks of said customer entered data signals;
   (d) static memory means for receiving from the receiving means and for temporarily storing at least a last received block of said received customer entered data signals during a data storage interruption or corruption event of said disk drive means;
   (e) enabling and disabling means for receiving first predetermined control signals from the microprocessor and in response from time to time selectively enabling and disabling said disk drive means; and
   (f) transferring means for receiving second predetermined control signals from said microprocessor and in response transferring, while said disk drive means is enabled, said last received block of said temporarily stored customer entered data signals from said static memory means to said disk drive means during a data storage procedure following said data storage interruption or corruption event, thereby ensuring storage of uncorrupted customer entered data on the magnetic disk means.

2. A data storage system as defined in claim 1, wherein said means for transferring is a direct memory access controller.

3. A data storage system as defined in claim 1, wherein said static memory means is comprised of one or more CMOS RAM circuits.

4. A data storage system as defined in claim 3, further including capacitor backup means connected to said static memory means for storing charge from a power supply means and for maintaining supply voltage to said static memory means and thereby preventing loss of said temporarily stored customer entered data signals in the event of a power failure.

5. A data storage system as defined in claim 4, further including a universal asynchronous receiver/transmitter connected to said means for receiving said customer entered data signals and said static memory means for transferring said customer entered data signals from said means for receiving to said static memory means.

6. A data storage system as defined in claim 5, wherein said means for enabling and disabling is further comprised of transistor circuitry connected to a source of D.C. power supply for alternately applying or removing operating power received from said D.C. power source, to said disk drive means in response to the generation or absence of generation respectively, of said first control signal.

7. A data storage system as defined in claim 1, further including backup voltage retention means connected to said static memory means for maintaining power supply voltage to said static memory means and thereby preventing loss of said temporarily stored customer entered data signals in the event of a power failure.

* * * * *